United States Patent [19]
Ganser et al.

[11] Patent Number: 5,850,912
[45] Date of Patent: Dec. 22, 1998

[54] HOUSING FOR ACCOMODATING AT LEAST ONE DISC-SHAPED INFORMATION CARRIER

[75] Inventors: Christa Ganser, Kaltenkirchen; Karen Schrader, Hamburg; Hartmut Van Eupen, Burgdorf-Ehlershausen; Hartmut Pfeiffer, Kankelau, all of Germany

[73] Assignee: U.S. Philips Corporation, New York, N.Y.

[21] Appl. No.: 961,415

[22] Filed: Oct. 30, 1997

[30] Foreign Application Priority Data

Nov. 2, 1996 [DE] Germany ............... 196 45 275.9

[51] Int. Cl.⁶ .................................. B65D 85/57
[52] U.S. Cl. ........................... 206/307; 206/308.1
[58] Field of Search ............... 206/307, 307.1, 206/308.1, 309, 232

[56] References Cited

U.S. PATENT DOCUMENTS 5,544,741  8/1996  Fantone et al. ............... 206/308.1

FOREIGN PATENT DOCUMENTS

3725616A1  2/1989  Germany .
4342865A1  6/1995  Germany .
29607929U  9/1996  Germany .
29610914U  10/1996  Germany .

Primary Examiner—David T. Fidel
Attorney, Agent, or Firm—Michael E. Belk

[57] ABSTRACT

A housing for accommodating at least one disc-shaped information carrier, for example a CD, includes a bottom part, a lid part, and a support part held by the housing for retaining the information carrier. The support part includes a raised side grip which enters a recess of the lid part when the housing is closed. To increase the stability of the housing and to provide better identification for different housings, a closed reservoir is arranged in at least one hollow space formed in the housing and filled with a substance.

13 Claims, 2 Drawing Sheets

HOUSING FOR ACCOMODATING AT LEAST ONE DISC-SHAPED INFORMATION CARRIER

FIELD OF THE INVENTION

The invention relates to the field of packaging of disk-shaped record carriers.

The invention relates to a housing for accommodating at least one disc-shaped information carrier, for example a CD, with a bottom part, a lid part, and a support part held by the housing for retaining the information carrier. The support part includes a raised side grip which enters a recess of the lid part when the housing is closed.

Such a housing is known from, for example, DE 3725616 A1. A hollow space is formed therein below the raised side grip, which space is bounded on the one hand by the walls of the side grip and on the other hand by the walls of the bottom part. Furthermore, the approximately square support part is provided with a circular depression for accommodating the information carrier. Four further, approximately triangular hollow spaces are formed in the four corner regions of the approximately square support part. The hollow spaces are bounded by walls of the support part and the bottom part.

The above citations are hereby incorporated in whole by reference.

SUMMARY OF THE INVENTION

The invention has for its object to utilize the hollow spaces in a housing of the kind mentioned in the opening paragraph for the improvement of the quality of the housing, on the one hand as regards the stability of the housing and on the other hand as regards a better distinguishing between different housings or the information carriers accommodated in the housings.

According to the invention, this object is achieved by a closed reservoir arranged in at least one hollow space formed in the housing. The reservoir is adapted to fit the hollow space and can be filled with a substance. This reservoir thus serves to increase the stability of the housing. Furthermore, the substance contained in the reservoir may also contribute to an increased stability, depending on the nature of the substance. The substance may be used for distinguishing between similar housings in a simple manner and without problems for filling the reservoirs with different substances.

In an embodiment of the invention, a rod-shaped reservoir is arranged in the hollow space formed by the side grip and adjoining walls of the bottom part and of the support part. The reservoir has, for example, a round or angular cross-section in a further embodiment of the invention. Such a rod-shaped reservoir in the vulnerable pivot region serves to increase the stability of the housing. The rod-shaped reservoir can be easily inserted into the bottom part before the support part is mounted. The support part is clamped into the bottom part. The reservoir is then kept in position by the side grip and by the walls of the support part and the bottom part.

In a further embodiment of the invention, the reservoir may be retained in the hollow space by clamping force or by adhesion. For adhesion the reservoir is glued either into the bottom part or into the support part below the raised side grip. The stability is further enhanced by such gluing. A glued connection is suitable, for example, for those housings in which the support part can hinge out and is designed for holding a CD on each side.

In a housing in which the support part is of transparent material, it is provided in a further embodiment of the invention that the reservoir is transparent and is filled with a liquid substance, for example water. Since the transparent side grip of the support part lies in a recess of the lid part when the housing is closed, the substance present in the transparent reservoir below the side grip is immediately recognizable, so that an immediate identification can take place on the basis of the substance present in the reservoir. An advantageous embodiment which allows of an easy identification is characterized by a colored substance.

To achieve an effective identification, a further embodiment is characterized in that the liquid substance contains air bubbles which move about inside the reservoir when the housing is moved.

A further advantageous embodiment of the invention is characterized in that the substance is mixed with floating particles. Such floating particles move about inside the reservoir when the housing is moved, their specific gravity being preferably lower than that of the substance. Such an effect is known per se from so-called snow globes in which shiny particles present in water achieve an effect as though snow were falling inside the globe when this globe is being moved. Thus a further embodiment of the invention is characterized by irregular shiny floating particles which suggest this snowfall effect.

A further embodiment of the invention is characterized by regularly shaped floating particles in the form of symbols, for example signs of the zodiac, small hearts, letters, or the like.

The reservoirs for containing the substance are preferably made from synthetic resin. A further embodiment of the invention is characterized in that the rod-shaped reservoir is provided using a filling tube closed by a plug at one of its end faces. The portion of the filling tube projecting into the reservoir is distant from the adjoining side walls of the reservoir. When the housing is held in vertical position with the filling tube facing down, the portion of the filling tube lying inside the reservoir is fully surrounded by the descended floating particles in the rest position and is thus no longer visible.

It is also conceivable, to utilize not only the hollow space present below the side grip but also further hollow spaces inside the housing for the purposes mentioned above. Such spaces are present, for example, in a construction in which the support part is provided with a depression for accommodating the information carrier. Approximately triangular hollow spaces bounded by the support part and the bottom part, are formed in the four corners of the support part in such a construction. Approximately triangular reservoirs could be accommodated in these hollow spaces. The reservoirs can again be utilized for enhancing the stability and for easier identification. Such triangular reservoirs can again be held or clamped in by said walls in the hollow spaces or can be glued into the support part or bottom part. These reservoirs may also be filled with colored substances and floating particles. However, such reservoirs would not be visible through a transparent support part when the housing is closed because in that case they would be covered by the lid part with the insert leaflet. Such reservoirs in the four corner regions of the transparent support part would not be visible until after the housing had been opened, i.e. the lid had been pivoted outwards.

Those skilled in the art will understand the invention and additional objects and advantages of the invention by studying the description of preferred embodiments below with

DETAILED DESCRIPTION OF THE PREFERRED EMBODIMENT

Figure 1:
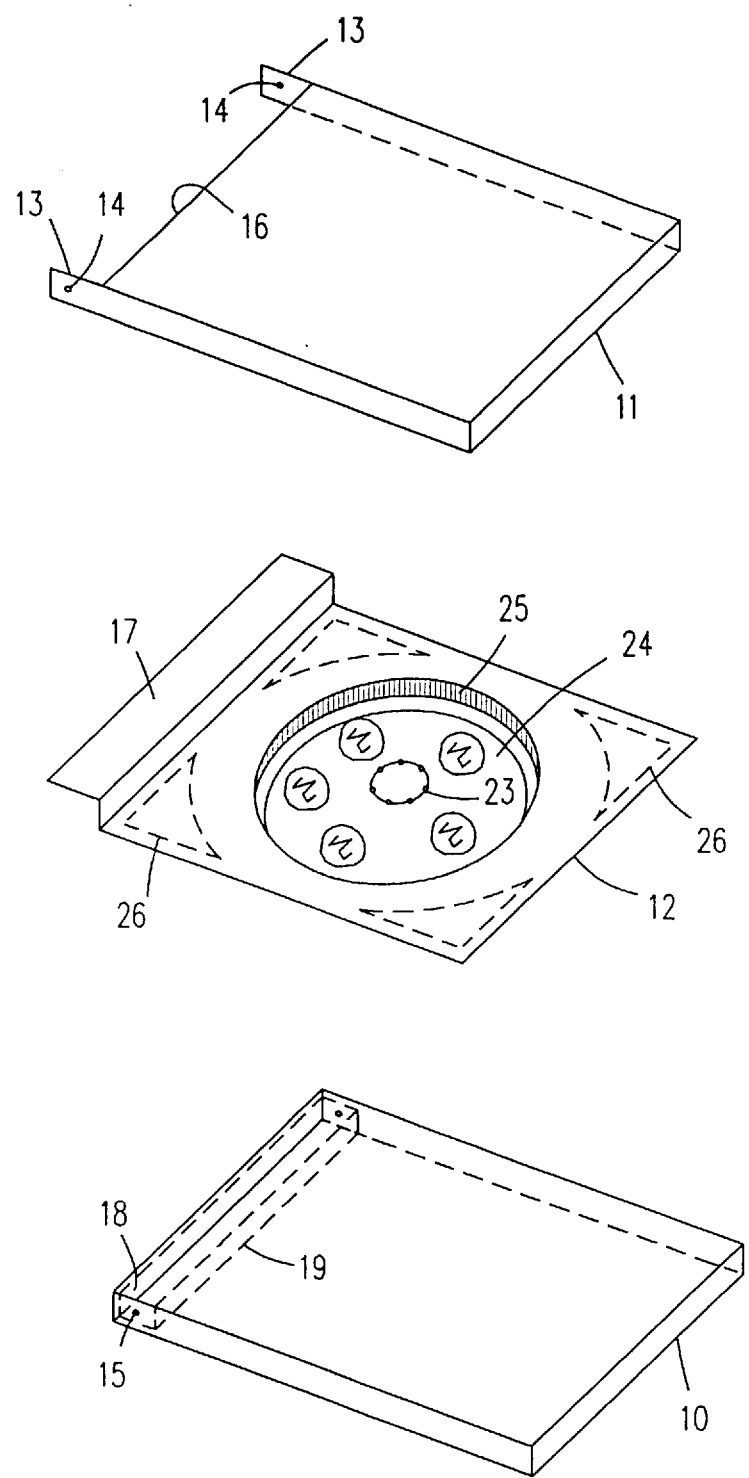
FIG. 1 shows a housing for accommodating a CD in perspective exploded view.

In FIG. 1, the housing includes a bottom part 10, a lid part 11, and a support part 12 which can be snapped home into the bottom part 10. The lid part 11 has two tags 13 with inwardly extending studs 14 which enter mating holes 15 of the bottom part 10, thus forming a hinged joint between the lid part 11 and the bottom part 10. The housing has a recess 16 left open by the lid part 11 on account of the projecting tags 13, into which recess a raised side grip 17 of the support part 12 enters in the assembled state, so that the housing is closed on all sides. A hollow space 18 is formed below the side grip 17 in the assembled state. The space 18 is bounded by the side grip 17 and by walls of the support part 12 and the bottom part 10. A reservoir 19, which is approximately rectangular in cross-section and which is shown in broken lines, is inserted into said hollow space 18 as shown in the lowermost drawing of FIG. 1. The reservoir is held by the side grip 17 and the walls of the support part 12 and of the bottom part 10 when the housing is in the assembled state.

Figure 2:
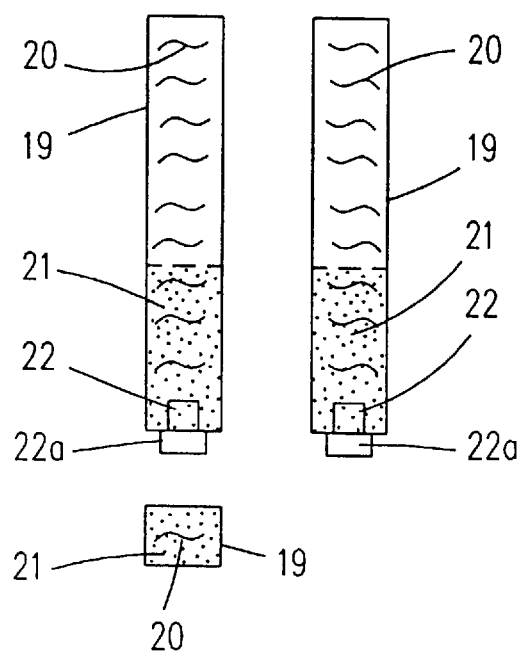
FIG. 2 illustrates three views a reservoir which can be inserted into the housing of FIG. 1.

This reservoir 19 is shown in three positions in FIG. 2. The reservoir is made from transparent synthetic resin and completely filled with water 20 in the present example. Floating particles 21 are present in the water, in this case so-called snow glitter particles, which in the rest position shown in FIG. 2, have dropped to the bottom and fill up the lower portion of the reservoir 19. The reservoir 19 is provided with a filling tube 22 which projects into the reservoir and which is closed with a plug 22a. The diameter of the filling tube 22 present in the reservoir is sufficiently small that it is completely surrounded by the floating particles 21 present in the liquid, when the latter is in rest, and is accordingly no longer visible.

When the housing with the inserted reservoir 19 is moved about, the snow glitter particles 21 will distribute themselves through the reservoir and give a suggestion of a snow storm. Other particles of any other shape whatsoever may be used instead of the snow glitter particles 21, for example signs of the zodiac, heart-shaped particles, or the like.

The support part 12 of FIG. 1 includes a centrally positioned retaining device 23 for retaining a CD 24 which lies in a depression 25 of the support part 12. As a result of this depression, four hollow spaces 26 are formed in the four corner regions of the approximately square support part. The spaces may also be used for accommodating corresponding triangular reservoirs, which in their turn may again be filled with a liquid substance and floating particles therein.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

We claim:

1. A housing for accommodating at least one disc-shaped information carriers, comprising:

a bottom part;

a lid part; and a support part held by the housing for retaining the information carrier and including a raised side grip which enters a recess of the lid part when the housing is closed, a closed reservoir arranged in at least one hollow space formed in the housing, which reservoir is adapted to fit the hollow space and can be filled with a substance.

2. The housing of claim 1, in which a rod-shaped reservoir is arranged in the hollow space formed by the side grip and adjoining walls of the bottom part and of the support part, which reservoir has, a round or angular cross-section.

3. The housing as claimed in claim 1 in which the reservoir is retained in the hollow space by the surrounding walls of the bottom part and of the support part.

4. The housing as claimed in claim 1 in which the reservoir is retained in the hollow space by a clamping action.

5. The housing as claimed in claim 1 in which the reservoir is fastened with glue into the bottom part or the support part below the side grip.

6. The housing of claim 1 in which the rod-shaped reservoir is provided with a filling tube closed by a plug at one of its end faces, and a portion of the filling tube projecting into the reservoir is distant from the adjoining side walls of the reservoir.

7. The housing of claim 1 in which:

the support part is transparent; and the reservoir is transparent and is filled with a liquid substance.

8. The housing as claimed in claim 7, in which the liquid substance is colored.

9. The housing as claimed in claim 7 in which the liquid substance contains air bubbles.

10. The housing as claimed in claim 7, in which the liquid substance is mixed with floating particles.

11. The housing as claimed in claim 10 in which the particles include irregular and shiny particles.

12. The housing as claimed in claim 10 in which the particles include regularly shaped floating particles in the form of one or more of figures, signs of the zodiac and letters.

13. The housing of in claim 1 in which:

at least one reservoir is retained in the hollow space by the surrounding walls of the bottom part and of the support part;

at least one reservoir is arranged in a hollow space bounded by the side grip;

at least one reservoir has an angular cross section;

at least one reservoir has a round cross section;

at least one reservoir is retained in the hollow space by a clamping action;

at least one reservoir is fastened with glue into the bottom part or the support part below the side grip;

at least one reservoir is rod-shaped;

the rod-shaped reservoir is provided with a filling tube closed by a plug at one of its end faces;

a portion of the filling tube projecting into the reservoir is distal from the adjoining side walls of the reservoir;

the support part is transparent;

at least one reservoir is transparent and is filled with a liquid substance;
the liquid substance is colored;
the liquid substance contains air bubbles;
the liquid substance is mixed with floating particles;
the particles include irregular and shiny particles; and
the particles include regularly shaped floating particles in the form of one or more of figures, signs of the zodiac, letters, and numbers.

* * * * *